United States Patent [19]
Spaeh et al.

[11] Patent Number: 5,688,610
[45] Date of Patent: Nov. 18, 1997

[54] DEVICE FOR GENERATING ENERGY

[75] Inventors: Richard Spaeh, Ueberlingen; Klaus-Peter Zurell, Friedrichshafen; Edmund Wegmann, Markdorf; Joerg Heitzer, Immenstaad; Reinhold Schamm, Stetten, all of Germany

[73] Assignee: Dornier GmbH, Germany

[21] Appl. No.: 686,961

[22] Filed: Jul. 26, 1996

[30] Foreign Application Priority Data

Jul. 27, 1995 [DE] Germany ............... 195 27 376.1

[51] Int. Cl.⁶ ............... H01M 8/12; H01M 8/24
[52] U.S. Cl. ............... 429/30; 429/34; 429/38
[58] Field of Search ............... 429/12, 30, 34, 429/35, 38, 39

[56] References Cited

U.S. PATENT DOCUMENTS

| | | | |
|---|---|---|---|
| 4,160,067 | 7/1979 | Camara et al. | 429/16 |
| 5,208,115 | 5/1993 | Akagi | 429/39 |
| 5,532,072 | 7/1996 | Spaeh et al. | 429/33 |
| 5,543,239 | 8/1996 | Virkar et al. | 429/33 |
| 5,549,982 | 8/1996 | Akagi | 429/30 |

FOREIGN PATENT DOCUMENTS

| | | |
|---|---|---|
| 0 450 336 A2 | 3/1991 | European Pat. Off. . |
| 43 24 907A1 | 1/1995 | Germany . |
| 4339405C1 | 1/1995 | Germany . |
| 64-77880 | 3/1989 | Japan . |
| WO 95/21469 | 8/1995 | WIPO . |

OTHER PUBLICATIONS

European Search Report Dated Nov. 12, 1996.

*Primary Examiner*—Stephen Kalafut
*Assistant Examiner*—Carol Chaney
*Attorney, Agent, or Firm*—Evenson, McKeown, Edwards & Lenahan P.L.L.C.

[57] ABSTRACT

The invention provides a fuel cell arrangement with a plurality of fuel cell stacks which are stacked on top of one another and are enclosed in a sealed exterior housing. Supply air is freely guided to the fuel cell stacks within the enclosure, while combustion gas is provided to the respective stacks by means of pipes. A plurality of flat seals are provided between adjacent fuel cell stacks, each having a central air opening and a separate peripheral combustion gas channel. The lowermost fuel stack is mounted by means of such a seal, on a base plate into which a collective channel for exhaust air and a channel for combustion gas are integrated.

4 Claims, 4 Drawing Sheets

DEVICE FOR GENERATING ENERGY

BACKGROUND AND SUMMARY OF THE INVENTION

The invention relates to a device for generating energy by means of a plurality of fuel cell stacks which are connected together.

Solid electrolyte fuel cells are electrochemical energy converters that produce electricity directly from gaseous energy sources (e.g. $H_2$, CO, $CH_4$). As a rule, they are based on zirconium oxide as the solid electrolyte that conducts oxygen ions, and are operated at temperatures of approximately 800°–1000° C. Since they are not subject to Carnot's law like thermal energy machines, they achieve much higher efficiencies of more than 50%. For this reason and because of their low pollutant emissions, they enjoy a high potential as future energy converters, especially when they use natural gas as the primary energy source.

A planar cell design is advantageous from the standpoint of economy and high energy density. In this arrangement, thin, solid electrolyte plates are coated on both sides with porous electrodes, and these are stacked on top of one another with connecting elements alternating, resulting in a bipolar arrangement. A plurality of individual cells can be connected in series by stacking them on top of one another. The result is a compact fuel cell stack.

The arrangements described for fuel cells can also be used for the reverse process of high-temperature electrolysis to produce hydrogen from water at approximately 800° to 1000° C. with high efficiency.

The following techniques for connecting fuel cell blocks are known from prior publications:

German patent document No. DE 43 24 907 A1 teaches a fuel cell model composed of a plurality of fuel cell stacks stacked on top of one another, with combustion gas supplied through pipes and a free air supply within a closed housing to the fuel cell stacks. The fuel cell stacks are supported by a wall and the exhaust air is carried away through pipes.

EP patent document 450 336 A2 teaches a device composed of fuel cells for energy production with the following features:

combustion gas guided freely in a housing fuel cell stacks not stacked air supply by pipes.

The goal of the present invention is to provide a connection of fuel cell stacks which are sealed to achieve a high packing density, a modular and scalable arrangement, as well as an easy interchangeability of the individual fuel cell stacks.

This goal is achieved by the device according to the invention, which comprises a plurality of fuel cell stacks connected to one another. Solid oxide fuel cells may be used, for example, as well as any other type of fuel cell. Combustion gas guidance and exhaust gas guidance, supply air guidance and exhaust air guidance, as well as a seal between the supply air area and the exhaust air area are also provided. According to the invention, supply air is guided by means of a housing that is common to a plurality of fuel cell stacks and is not connected directly with the fuel cell stacks. Moreover, a plurality of fuel cell stacks are connected to a common base plate to guide the exhaust air, such plate serving as a supporting element or base for the fuel cell stacks.

The seal of the supply air area and exhaust air area between the connecting element and the fuel cell stacks is designed so that any mechanical stresses which occur, for example, due to differences in thermal expansion of the connecting element and the fuel cell stacks or caused by thermal deformations, are compensated by the seal. The fuel cell stacks are each provided with gas-tight connecting elements to conduct the combustion gas. Alternatively, internal guidance can be provided for the combustion gas as well.

A power-generating device of considerable power can be produced by the device according to the invention, composed of individual fuel cell stacks connected in modular fashion.

Other objects, advantages and novel features of the present invention will become apparent from the following detailed description of the invention when considered in conjunction with the accompanying drawings.

DETAILED DESCRIPTION OF THE DRAWINGS

Figure 1:
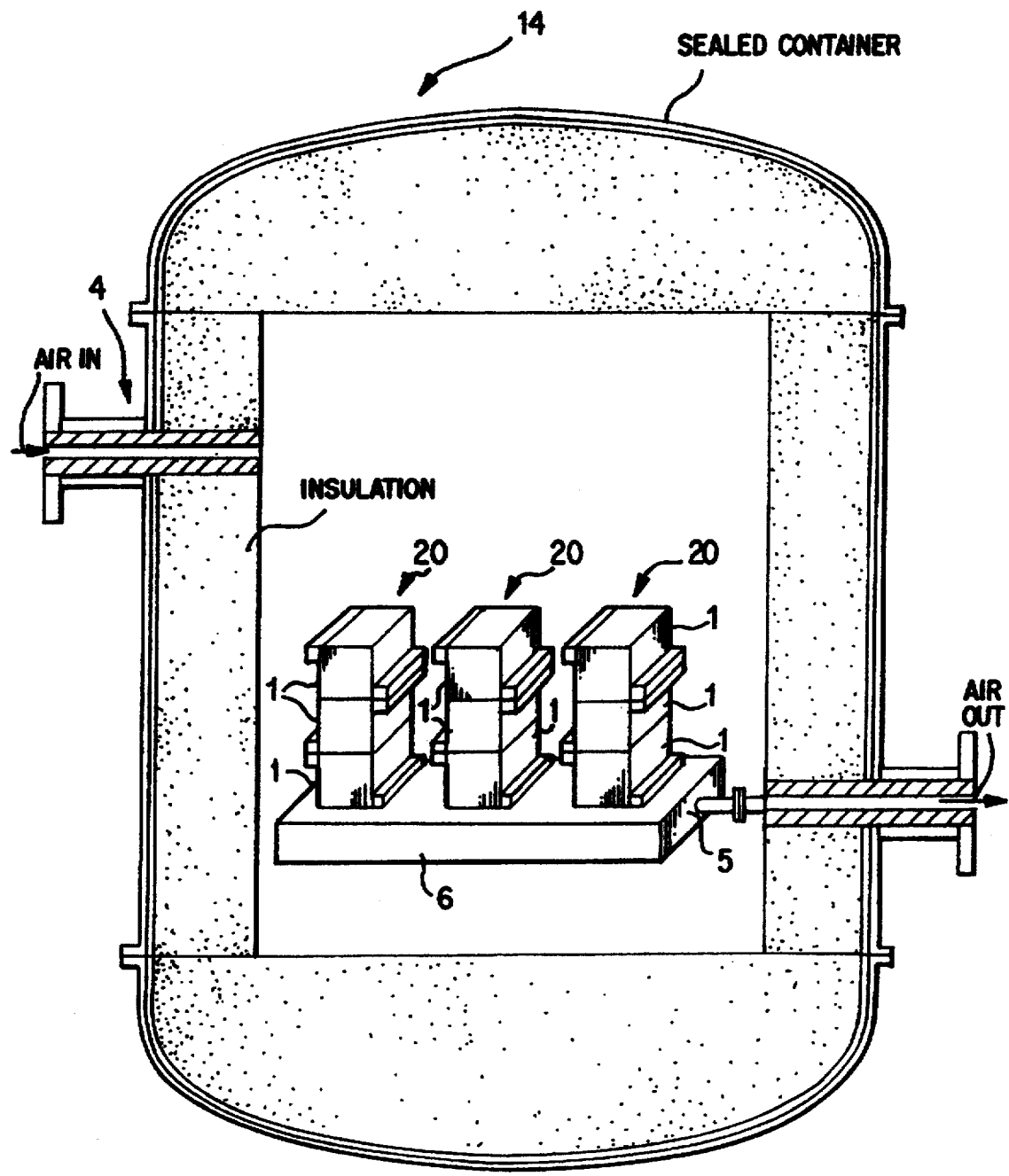
FIGS. 1 and 2 show the device according to the invention with a plurality of fuel cell modules and fuel cell stacks.
Figure 2:
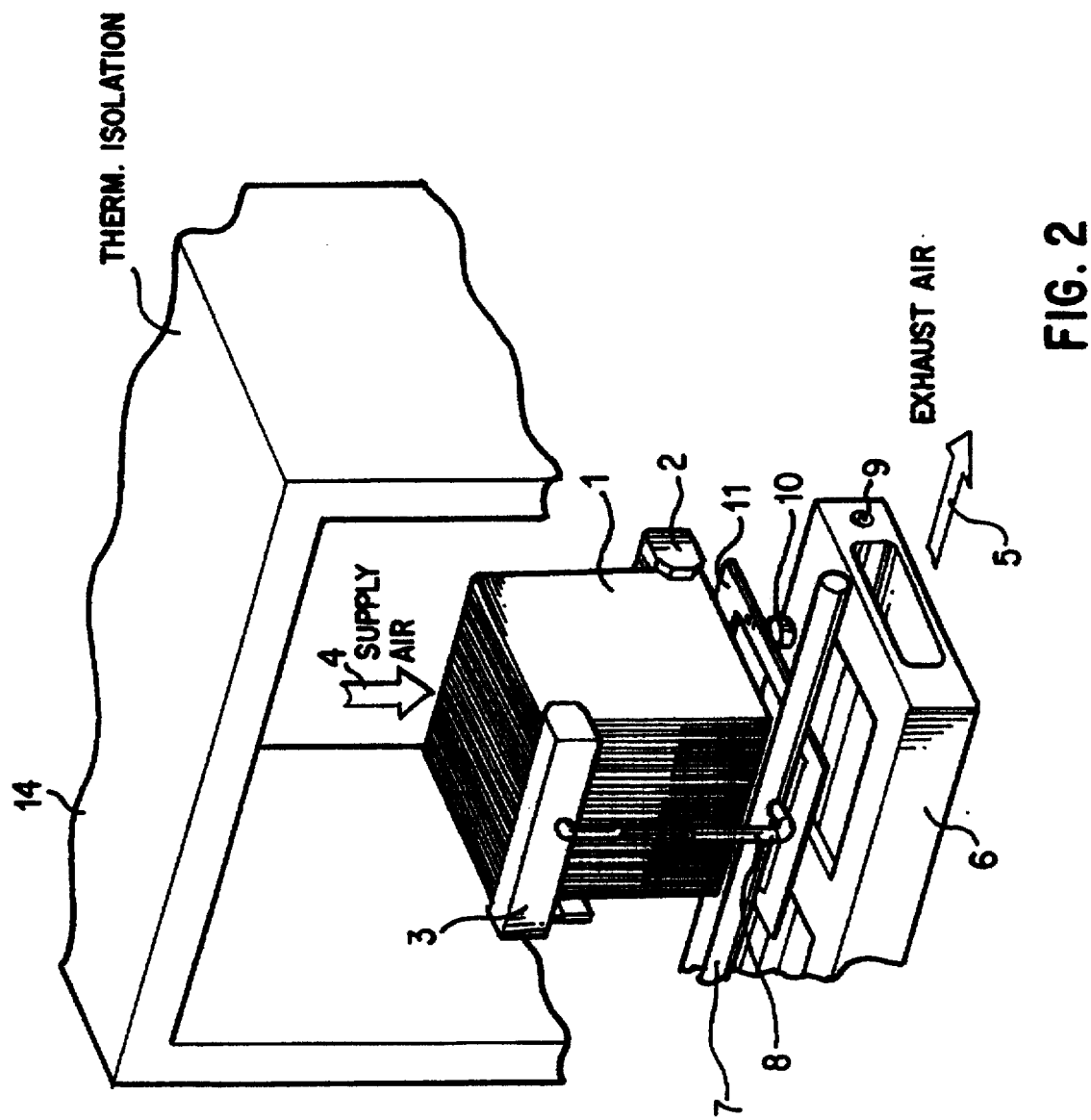

FIGS. 1 and 2 show the schematic arrangement and design of the modular connection of the fuel cell stacks according to the invention. Only one stack 1 of the several stacks arranged side by side or behind one another is shown in FIG. 2. The external air guidance 4 required for the function of the fuel cell stack 1 is provided by conducting the supply air into a sealed housing 14, without a direct connecting element to the individual fuel cell stacks 1. This housing 14 thus provides air guidance for several stacks 1. Several fuel cell modules 20 are shown in FIG. 1; combustion gas guidance is not shown in FIG. 1.

Figure 3:
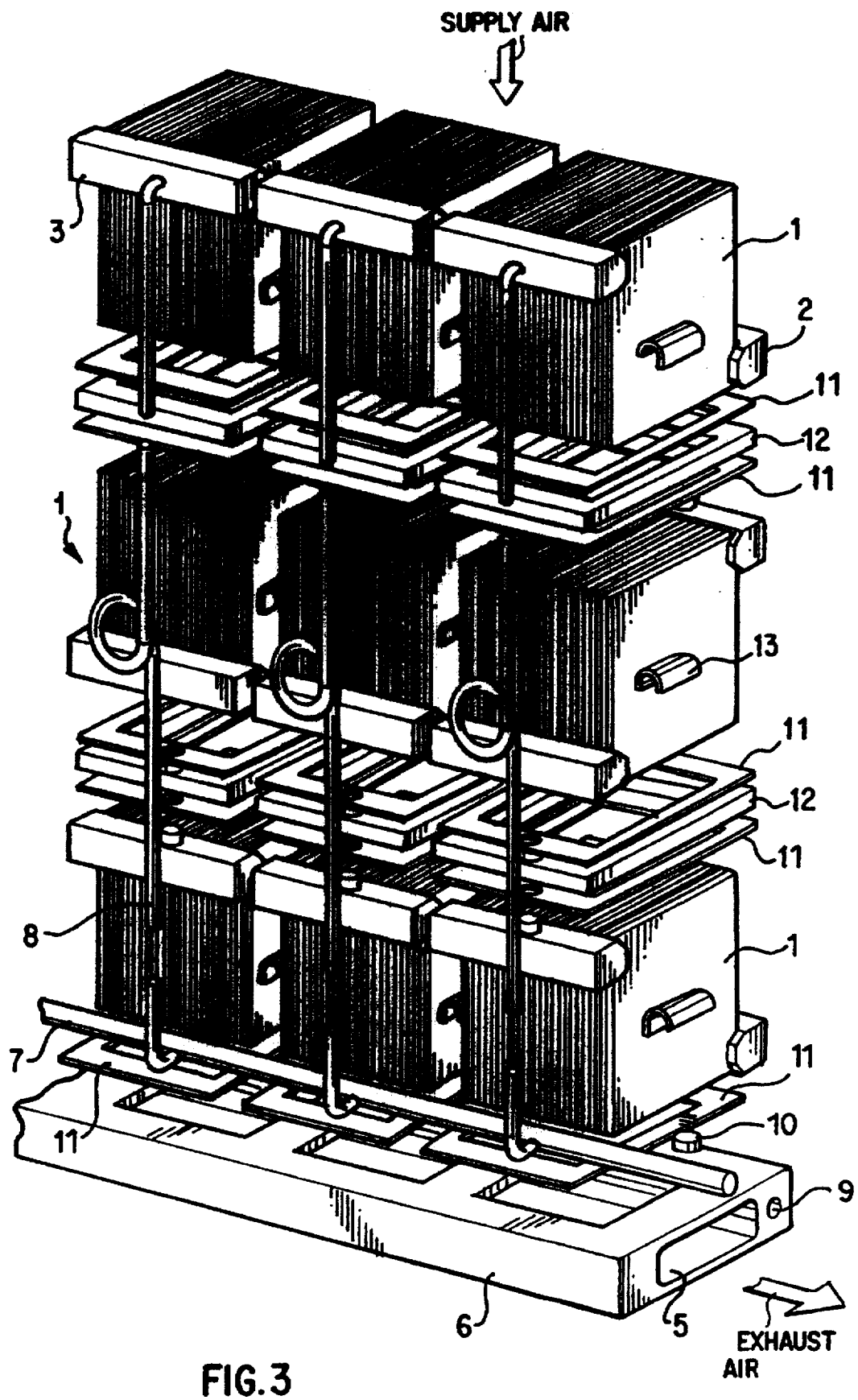
FIG. 3 shows the device according to the invention with fuel cell stacks stacked side by side and on top of one another, in a partially exploded view.

To guide the exhaust air, fuel cell stacks 1 are located on a base plate 6 that is common to several fuel cell modules 20, which plate is also referred to as a carrier plate or bottom plate. A channel 5 to conduct exhaust air is also integrated into this base plate 6, as best shown in FIGS. 2 and 3. Base plate 6 supports fuel cell modules 20 that consist of fuel cell stacks 1 stacked on top of one another (FIG. 2).

The external combustion gas guidance required for the function of the fuel cell blocks is provided by two connecting elements 2, 3 connected in a gas-tight manner to fuel cell stacks 1, as shown in FIG. 3. The guidance of the combustion gas inward and of the exhaust gas outward is provided by pipes 7, 8 mounted in serial fashion with strain reliefs, possibly mounted on base plate 6 and/or by means of channels 9 integrated into base plate 6 and connecting elements 10 to create a connection to gas-connecting elements 2. Alternatively, internal combustion gas guidance can also be provided in which the combustion gas is conducted through openings made in the marginal area of the fuel cell stack.

It is an important feature of the invention that absolute tightness is not required between exhaust air area 5 and supply air area 4. Firstly, the fuel cells are operated with excess air, and secondly, the adverse effects on the efficiency of a system are negligible if the leaks between supply air 4 and exhaust air 5 do not exceed approximately 5% of the total air supply. This means that absolute gas tightness is not required for the flat seal 11 (FIGS. 2, 3, and 4) and a positive connection between fuel cell stacks 1 and base plate 6 can be disregarded. This feature makes it possible to use economical, commercially available materials for base plate 6, whose thermal expansion behavior does not have to be adapted to the fuel cell stacks.

Figure 4:
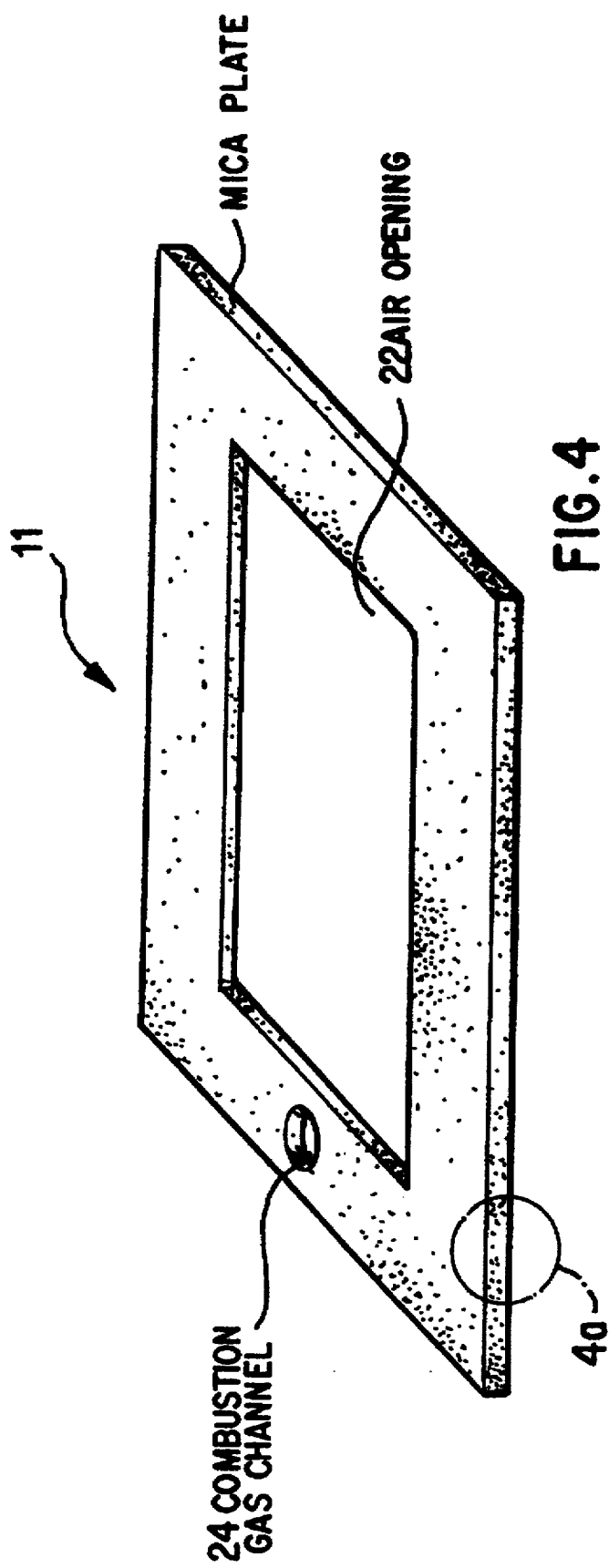
FIG. 4 shows a seal according to the invention.
Figure 4A:
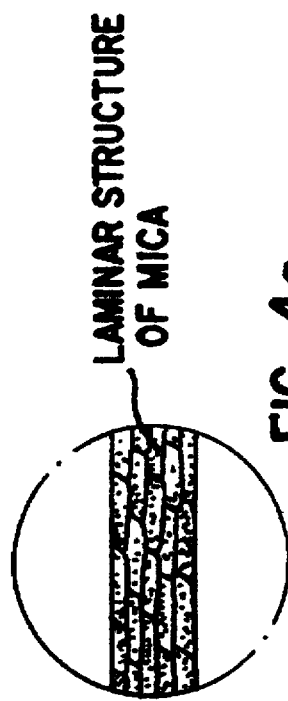

The key to the functional ability of this arrangement is gasket 11 on the air side between the fuel cell stacks and seal 11 between the fuel cell stacks and base plate 6. The seal, which is flat (as shown in FIG. 4) and in the form of a disk, equalizes any mechanical stresses that might develop, while simultaneously guaranteeing tightness in the event of thermal deformations between the fuel cell stacks and the supporting element.

Materials with laminar structures, such as mica, are especially suitable as sealing materials since no forces can be transmitted owing to the weak bond between the individual layers. Ceramic random-laid nonwoven fibers or fiber mats are also suitable. Flat seal 11 is clearly shown in FIG. 4, in which an enlarged section shows its structure.

It is also advantageous in this design (FIG. 3) that fuel cell stacks 1 press down on flat seal 11 by their own weight, and pressure is also exerted on the stack as a result of the pressure loss in the fuel cell stacks on the air side.

FIG. 3 is a schematic depiction of a fuel cell modular unit in which a plurality of fuel cell stacks 1 is mounted on a base plate 6 and stacked on top of one another by means of seals 11 and spacers 12. Seals 11 are provided between the individual stacked fuel cell stacks and between fuel cell stacks 1 and base plate 6. The air supply is provided sequentially from each of the uppermost stacks in a stack to the lowest stack. This arrangement has the advantage that a major differential created by the technique employed is produced between the supply air temperature and the exhaust air temperature. Flat seal 11 and spacer 12 each have a central air opening 22 and a peripheral combustion gas channel 24.

In supplying the combustion gas, both parallel and serial connection of the combustion gas is possible. A serial connection for the combustion gas has the advantage that high reaction rates can be achieved with the combustion gas. Electrical connection of the individual fuel cell stacks is provided by terminals 13 connected to the blocks.

Base plate 6 can consist of alloys that are resistant to high temperature (Haynes 214, Inconel 800, Inconel 617, or Inconel 600, etc., for example), or of ceramic materials (for example, mullite, SiC, $Al_2O_3$, etc.).

Internal thermal insulation of exhaust air chamber 5 is advantageous when using alloys. This produces thermal decoupling of the hotter exhaust air area from the supply air area, as well as "cooling" of the supporting elements by the supply air.

In an advantageous embodiment, the exhaust gas can be conducted into housing 14 for the supply air for afterburning. Alternatively, in another embodiment (not shown), the exhaust gas can be conducted into exhaust air channel 5 of base plate 6 for direct afterburning. In still another embodiment (not shown), the guidance for the exhaust air and supply air can be switched.

As previously mentioned, the fuel cells of the device according to the invention can also be operated as electrolysis cells.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fuel cell module comprising:

a plurality of fuel cell stacks stacked on top of one another;

a combustion gas supply connected to said fuel cell stacks by means of pipes;

a closed housing enclosing the fuel cell stacks and defining an air supply therein, air in said air supply surrounding said fuel cell stacks and being in flow communication therewith; and a plurality of flat seals (11) provided between each of the fuel cell stacks (1) that are located on top of one another in the stack, said seal having a central air opening (22) and a peripheral, separate combustion gas channel (24);

wherein the lowermost fuel cell stack (1) is mounted by one of said seals (11) on a base plate (6), into which base plate a collecting channel (5) for the exhaust air and a channel (9) for the combustion gas are integrated.

2. Fuel cell module according to claim 1, wherein a first flat seal (11), a spacer (12) with a central air opening (22) and a separate peripheral combustion gas channel (24), and a second flat seal (11) are located between each of fuel cell stacks (1).

3. Fuel cell module according to claim 1, wherein said seal (11) is made of mica.

4. Fuel cell module according to claim 3, wherein said seal (11) has a laminar structure.

* * * * *